Patented Sept. 19, 1950

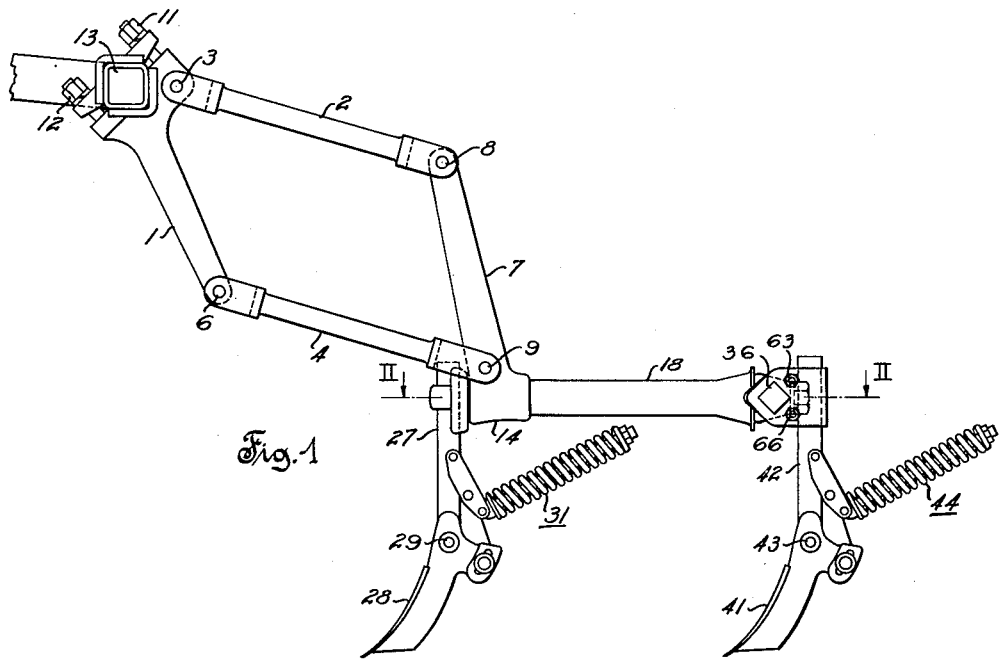
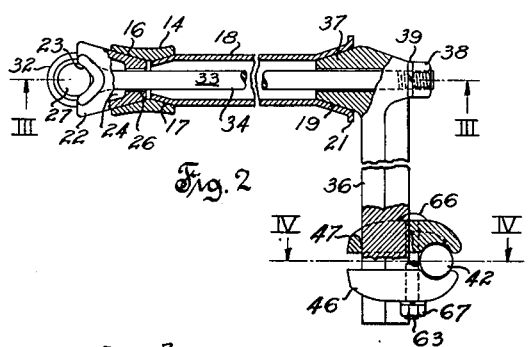
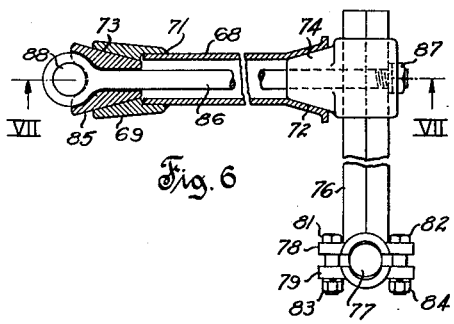
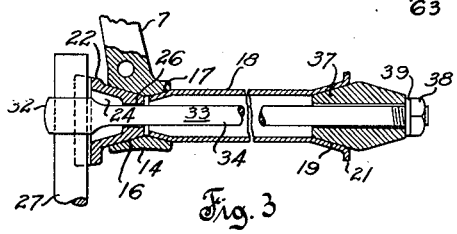
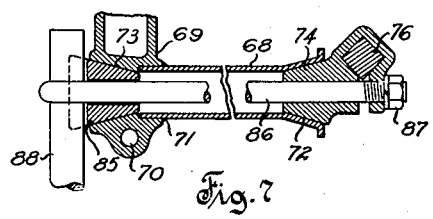
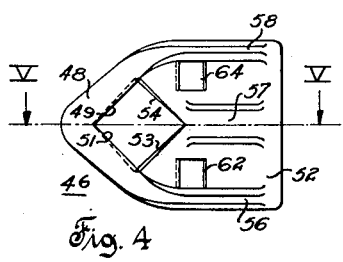
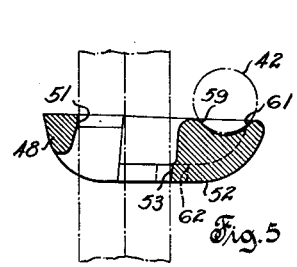

2,522,702

UNITED STATES PATENT OFFICE 2,522,702

TOOL MOUNTING FOR AGRICULTURAL IMPLEMENTS

Walter G. Charley, La Crescent, Minn., assignor to Allis-Chalmers Manufacturing Company, Milwaukee, Wis., a corporation of Delaware Application July 13, 1946, Serial No. 683,469

20 Claims. (Cl. 97—198.1)

1

The invention relates to implements for soil tilling and similar operations, and it is concerned more particularly with an improved mounting of earth engaging tools on such implements.

In cultivators, and more particularly in cultivator attachments for tractors, it has heretofore been usual to mount a plurality of shovel supporting standards on a common gang bar by means of individual clamping devices, the gang bar being suitably bent to provide for staggering of the shovels transversely of their direction of propulsion. Certain types of clamping devices which have heretofore been used for mounting the shovel standards on the gang bar required two bolts each, and others required even more than two bolts, in order to secure each clamping device and its associated shovel standard in fixed position on the gang bar. With such clamping devices it was necessary when setting up the implement for field operation, as for instance a tractor mounted cultivator having four tool gangs and two or more shovels to each gang, to tighten a relatively large number of bolts or nuts. Similarly, in order to change the setting of the shovels when required, that is, to readjust their working positions, it was necessary to loosen a relatively large number of bolts or nuts, and then tighten them again, all of which was somewhat unsatisfactory because of the required time and labor.

It is an object of the invention to provide an improved tool gang assembly for agricultural implements and the like, and more particularly to provide a mounting for earth engaging tools which permits convenient installation of the tools in said assembly, and individual adjustment of the tools, within a relatively short time and with a minimum of labor.

Another object of the invention is to provide an improved built-up structure for mounting earth engaging tools thereon, and in which a number of constituent parts of said mounting structure are securely held together in assembled condition by releasable clamping means.

More particularly, it is an object of the invention to provide a built-up mounting structure of the character set forth hereinabove, in which the constituent parts of the mounting structure may be adjusted relative to each other upon loosening of the clamping means, and in which such relative adjustment of said constituent parts will be effective to change the relative position of earth engaging tools which are connected, respectively, with said parts.

2

A further object of the invention is to provide an improved clamping device for mounting an earth engaging tool in operative position on an implement.

A still further object of the invention is to provide an improved tool gang assembly for agricultural implements which is simple and compact in construction, efficient in operation, and which may be manufactured at relatively low costs.

The foregoing and other objects and advantages of the invention will become more fully apparent from the following description of a preferred embodiment of the invention shown in Figs. 1–5 of the accompanying drawings, and of a modified construction shown in Figs. 6 and 7 of the accompanying drawings.

Referring to the drawings:

Fig. 1 is a side view of a tool gang assembly and of a parallel link mechanism for connecting the tool gang assembly to a tractor, not shown;

Fig. 2 is an enlarged section on line II—II of Fig. 1;

Fig. 3 is a section on line III—III of Fig. 2;

Fig. 4 is an enlarged side view of a clamp block shown in Figs. 1 and 2, the view of Fig. 4 being taken in the direction of arrows IV—IV in Fig. 2;

Fig. 5 is a sectional view on line V—V of Fig. 4, certain parts cooperating with the clamp block as shown in Fig. 2 being also shown in Fig. 5; and Figs. 6 and 7 show a modification of the tool gang assembly shown in Figs. 1–3, Fig. 6 being a sectional view similar to Fig. 2 and Fig. 7 being a section on line VII—VII of Fig. 6.

The parallel link mechanism shown in Fig. 1 comprises a front bracket 1, an upper link 2 pivotally connected at its forward end with the bracket 1 by a pivot pin 3, a lower link 4 pivotally connected at its forward end with a lower end of the bracket 1 by a pivot pin 6, and a rear bracket 7 pivotally connected with the rear end of the upper link 2 by a pivot pin 8 and with the rear end of the lower link 4 by a pivot pin 9. The bracket 1 has a split head which is clampingly secured by means of bolts and nuts 11 and 12 to a cross bar 13. The cross bar 13 is held in a fixed position by any suitable means on a tractor, not shown, and serves to transmit draft from the tractor to the front bracket 1.

The rear bracket 7 comprises an arm extending between the rear ends of the upper and lower links 2 and 4, and a sleeve portion 14 integrally formed with the arm and disposed on a horizontal axis at right angles to and below the axis of the pivot pin 9. Referring to Fig. 3, the sleeve portion 14 has a conical inner wall 16 tapering rearwardly from the front end of the sleeve portion, and another conical wall 17 which tapers forwardly from the rear end of the sleeve portion. A gang tube 18 is arranged coaxially with the sleeve portion 14 and extends a substantial distance rearwardly from the latter, as shown in Fig. 1. The gang tube 18 has a conical forwardly tapering front portion which abuttingly engages the sleeve portion 14 by being wedgingly seated on the conical inner wall portion 17 of the sleeve portion 14, as shown in Figs. 2 and 3. A portion of the gang tube 18 adjacent to the rear end of the latter is conically enlarged, as by flaring the tube, to provide another conical seat 19, and a short radial flange 21 is formed at the rear end of the tube.

An adapter 22 at the forward end of the sleeve portion 14 has a rearwardly tapering conical portion which is wedgingly seated on the conical wall 16 of the sleeve 14, and integrally formed with the conical portion of the adapter 22 is a head portion having groove 23 extending transversely to the axis of the conical portion of the adapter. The adapter 22 has an axial aperture providing a relatively large recess 24 in the head portion of the adapter and a cylindrical passage 26 through the conical portion of the adapter.

The groove 23 of the adapter 22 affords a seat for a cylindrical supporting standard 27, and a cultivator shovel 28 is mounted on the supporting standard 27 as shown in Fig. 1. The mounting of the cultivator shovel 28 on the standard 27 conforms with conventional practice, that is, the shovel is pivotally connected to the standard by means of a pivot pin 29 and a conventional spring trip mechanism, generally designated by the reference character 31, is operatively interposed between the shovel 28 and the supporting standard 27 in order to resiliently retain the shovel against rearward swinging movement about the pivot pin 29 and to hold it in operative position.

The cylindrical upper part of the supporting standard 27 extends axially through the loop 32 of an eye bolt generally designated by the reference character 33. The recess 24 of the adapter 22 partially accommodates the loop of the eye bolt 33, and the shank 34 of the eye bolt extends freely through the cylindrical passage 26 of the adapter 22. Suitable provisions are made, as will be described hereinbelow, for exerting rearward pull on the eye bolt 33, and it will be seen that such rearward pull will be effective to draw the supporting standard 27 into the groove 23 of the adapter 22 and to force the conical portion of the adapter 22 into wedging engagement with the conical wall 16 of the sleeve portion 14.

As shown in Figs. 1 and 2, a beam 36 is arranged in rear of the gang tube 18, the beam being shown to extend horizontally and at right angles to the axis of the gang tube 18. The beam is formed of rectangular bar stock and is upset at one end to provide a conical hub portion 37 thereon which is suitably tapered to match the taper of the conical seat 19 at the rear end of the gang tube 18. The hub 37 has an axial passage and the shank 34 of the eye bolt 33 extends freely through said passage and projects rearwardly beyond the hub 37. A nut 38 is threaded upon the rearwardly projecting portion of the shank 34, and a lock washer 39 is interposed between the hub 37 and the nut 38.

In the assembled condition of the tool gang, as shown in Figs. 1-3, the nut 38 is drawn up to force the conical hub 37 into wedging engagement with the conical seat 19 of the tube 18, and it will be seen that the reaction between the nut 38 and the shank 34 subjects the eye bolt 33 to the mentioned rearward pull which forces the supporting standard 27 into the groove 23 of the adapter 22 and simultaneously forces the conical portion of the adapter 22 into wedging engagement with the wall 16 of the sleeve 14. It will also be noted that by drawing up the nut 38 on the eye bolt 33 the forward conical portion of the gang tube 18 will be drawn into wedging engagement with the conical wall 17 of the sleeve portion 14, and that the whole assembly comprising the supporting standard 27, adapter 22, sleeve portion 14, gang tube 18 and beam 36 will be rigidly held together by the eye bolt 33 and the nut 38, upon tightening of the latter.

The beam 36 serves to support another cultivator shovel 41 rearwardly of and in laterally spaced relation to the cultivator shovel 28, as shown in Figs. 1 and 2. The cultivator shovel 41 is mounted on the lower end of a supporting standard 42, the mounting of the shovel 41 on the supporting standard 42 corresponding to the mounting of the shovel 28 on the supporting standard 27. That is, the shovel 41 is pivotally secured to the lower end of the standard 42 by means of a pivot pin 43, and a conventional spring trip mechanism generally designated by the reference character 44 is operatively interposed between the shovel 41 and the supporting standard 42. A clamping device for securing the supporting standard 42 to the beam 36 comprises two clamp blocks 46 and 47 which have square openings for the reception of the beam 36 and jaw portions embracing the tool standard 42.

The clamp blocks 46 and 47 are of identical construction, and the clamp block 46 is shown on an enlarged scale in Figs. 4 and 5. Referring to these latter figures, the clamp block 46 comprises a yoke portion 48 with inner edges 49 and 51 at right angles to each other and a wall portion 52 with inner edges 53 and 54 at right angles to each other. The square opening defined by the edges 49, 51 and 53, 54 accommodates the beam 36 in such a manner that the clamp block may be tilted relative to the beam to an inclined position transversely of the latter, and upon adjustment of the clamp block to such inclined position, the clamp block may be moved axially of the beam without gripping the latter. At the side of the wall portion 52 facing the supporting standard 42, the clamp block has three ribs 56, 57 and 58. The rib 57, as shown in Fig. 5, has an arcuately recessed edge portion for contact with a cylindrical upper portion of the supporting standard 42, the curvature of the arcuately recessed edge portion being such as to afford two contact points 59 and 61 with the cylindrical surface of the supporting standard 42. The ribs 56 and 58 have corresponding arcuately recessed edge portions for contact with the cylindrical surface of the supporting standard 42. A square hole 62 is formed in the wall portion 52 between the ribs 56 and 57 for the reception of a carriage bolt 63 (Figs. 1 and 2), and a similar hole 64 is formed in the wall portion 52 between the ribs 57 and 58 for the reception of another carriage bolt 66 (Figs. 1 and 2).

The two clamp blocks 46 and 47 are aligned on the beam 36 and are drawn together by means of nuts 67 on the carriage bolts 63 and 66, respectively. Upon tightening of the nuts 67, the arcuate edges of the ribs 56, 57 and 58 on the clamp block 46 and corresponding arcuate edges on the clamp block 47 engage the cylindrical surface of the supporting standard 42, and the clamp blocks pivot slightly about the supporting standard 42 with the result that the edges 49 and 51 of the square openings of the clamp blocks grip the beam 36 at the forward sides of the latter, and that the edges 53 and 54 of the square openings of the clamp blocks grip the beam 36 at the rearward sides of the latter. It will thus be seen that tightening of the nuts 67 on the carriage bolts 63 and 66 is effective to securely fasten the supporting standard 42 and the clamp blocks 46 and 47 to the beam 36, and that upon loosening of the nuts 67 the supporting standard 42 is released for adjustment in the direction of its axis and for rotation about its axis relative to the beam 36, and that the clamp blocks 46 and 47 are also released for adjustment longitudinally of the beam 36. Accordingly, the cultivator shovel 41 may be adjusted to various positions transversely and axially of the beam 36 by means of the clamping device comprising the clamping blocks 46 and 47, and the operative position of the shovel may further be adjusted by rotation of the supporting standard 42 about its own axis.

As shown in Figs. 1 and 2, the supporting standard 27 for the forward cultivator shovel 28 extends vertically at right angles to the axis of the gang tube 18, and the beam 36 extends horizontally at right angles to the axis of the gang tube 18. As explained hereinbefore, the nut 38 on the eye bolt 33 is tightened up to draw the supporting standard 27 and the end section comprising the beam 36, toward each other with the result that the supporting structure comprising the sleeve 14 and the gang tube 18 are subjected to compression and that the supporting standard 27 and the beam 36 will be secured against relative displacement from the positions in which they are shown in Figs. 1 and 2. Upon loosening of the nut 38 on the eye bolt 33 the supporting standard 27 and the beam 36 are simultaneously released for adjustment relative to the sleeve 14 and relative to the gang tube 18 respectively, and the gang tube 18 is also released for rotation relative to the sleeve 14 about the horizontal axis of the latter. In other words, upon loosening of the nut 38, the supporting standard 27 may be moved axially of the groove 23 in the adapter 22; and the adapter 22, the supporting standard 27, and the eye bolt 33 may be rotatively adjusted as a unit, relative to the sleeve 14 about the axis of the latter; and the supporting standard 27 may further be rotatively adjusted about its own axis within the loop of the eye bolt 33. Release of the axial pressure of the conical hub 37 upon the conical seat 19 of the gang tube 18, due to the loosening of the nut 38, further permits rotary adjustment of the beam 36 about the axis of the gang tube 18.

From the foregoing explanations it will be seen that the tool gang assembly shown in Figs. 1 to 3 includes a single actuating element, namely, the nut 38, by means of which the tool supports comprising the supporting standard 27 and the beam 36 may be clampingly secured in different positions of adjustment relative to the supporting structure comprising the rear bracket 7 with its sleeve portion 14 and the gang tube 18. The adapter 22 is associated with the supporting standard 27 and cooperative with the sleeve portion 14 to determine the angular relationship between the supporting standard 27 and the axis of the sleeve portion 14 and, on the other hand, the conical hub 37 of the beam 36 constitutes, in effect, another adapter which is associated with the beam 36 and is cooperative with the gang tube 18 to determine the angular relationship between the beam 36 and the axis of the gang tube 18. The eye bolt 33 and the nut 38 represent releasable fastening means common to the supporting standard 27 and to the end section comprising the beam 36 and its associated hub portion 37, and such releasable fastening means are operable to clampingly secure the adapter 22, and the adapter represented by the hub portion 37, in their cooperative relations with the sleeve portion 14 and with the gang tube 18, respectively.

Generally stated, the tool gang assembly shown in Figs. 1–3 comprises a mounting structure represented by the sleeve 14 and the gang tube 18; a pair of tool supports represented, respectively, by the supporting standard 27 and by the end section comprising the beam 36; and the tool gang assembly further comprises clamping means reacting against said mounting structure and cooperative, respectively, with said tool supports to secure the latter in fixed positions on said mounting structure upon tightening of said clamping means, such clamping means being represented by the adapter 22, hub 37, eye bolt 33, and nut 38; and it will be seen that said clamping means includes a single actuating element, namely, the nut 38, operable to simultaneously tighten said clamping means.

As explained hereinbefore, the gang tube 18 has a forward conical portion which is wedgingly seated on the conical wall 17 of the sleeve portion 14, and upon removal of the nut 38 from the eye bolt 33, the gang tube 18 may be axially withdrawn from the sleeve portion 14.

According to the modified construction shown in Figs. 6 and 7, a gang tube 68 has a straight forward end portion which is fitted into a cylindrical counterbore of a sleeve portion 69, and the gang tube 68 is permanently connected to the sleeve portion 69 by a circumferential welded seam 71 at the rear end of the sleeve portion 69. The gang tube 68 has an outwardly flared portion at its rear end to provide a conical seat 72 on the gang tube 68, corresponding to the conical seat 19 of the gang tube 18, and the sleeve portion 69 has a conical wall 73 corresponding to the conical wall 16 of the sleeve portion 14. The sleeve 69 shown in Fig. 7 forms the lower part of a supporting bracket of the same general character as the rear bracket 7 shown in Fig. 1, a lug projecting downwardly from the sleeve portion 69, having a hole 70 for the reception of a pivot pin, such as the pivot pin 9 shown in Fig. 1.

The modified construction shown in Figs. 6 and 7 further differs from the construction shown in Figs. 2 and 3 in that a separate adapter 74 is operatively interposed between the gang tube 68 and a transverse tool carrying beam 76. The adapter 74 has a conical portion wedgingly seated on the seat 72 of the gang tube 68, and integrally formed with the conical portion of the adapter 74 is a split head embracing the beam 76. The beam 76 is formed of rectangular bar stock and the split head of the adapter 74 has a square opening for the reception of the beam 76.

A suitable clamping head for securing a cylindrical tool supporting standard 77 to the beam 76 comprises a bracket portion 78 integrally formed with the beam 76 at one end of the latter, a cap 79, and a pair of bolts 81 and 82 and nuts 83 and 84 on the bolts 81 and 82, respectively, for tightening the clamping head upon the supporting standard 77. The beam 76 is guided within the split head of the adapter 74 for adjustment in the direction of its axis relative to the latter. An eye bolt 86, corresponding to the eye bolt 33 in Figs. 2 and 3, has a shank extending axially through the adapter 74, and a nut 87 is threaded upon a portion of the shank of the eye bolt projecting rearwardly beyond the adapter 74.

Wedgingly seated on the conical wall 73 of the sleeve portion 69 is another adapter 85 which is generally similar to the adapter 22 shown in Figs. 2 and 3, and serves to position a cylindrical tool supporting standard 88 at the forward end of the mounting structure comprising the sleeve 69 and the gang tube 68. The standard 88 extends axially through the loop of the eye bolt 86, and upon tightening of the nut 87 on the eye bolt 86 the tool standard 88 is urged into engagement with a groove at the free end of the adapter 85, and the conical portion of the adapter 85 is wedgingly urged upon the seat 73 of the sleeve 69. The reaction between the nut 87 and the eye bolt 86 is further effective to tighten the split head of the adapter 74 upon the beam 76 and to urge the conical portion of the adapter 74 wedgingly upon the conical seat 72 of the gang tube 68. It will thus be seen that the tool standard 88 and the tool supporting beam 76 are secured in fixed positions on the supporting structure comprising the gang tube 68 and the sleeve 69 by tightening of the nut 87, and that upon loosening of the nut 87 the tool standard 88 and the beam 76 are released for adjustment relative to said supporting structure. That is, upon loosening of the nut 87, the tool standard 88 may be adjusted in the direction of its axis transversely of the adapter 85, and the tool standard may also be rotatively adjusted about its own axis relative to said adapter, and the eye bolt 86, adapter 85 and tool standard 88 may be rotatively adjusted as a unit about the longitudinal axis of the sleeve 69 and gang tube 68. Moreover, upon release of the tension on the eye bolt 86 by backing off the nut 87, the beam 76 may be adjusted in the direction of its axis relative to the adapter 74, and the beam 76 and the adapter 74 may be rotatively adjusted as a unit about the longitudinal axis of the sleeve 69 and the gang tube 68.

The adapter 73 is cooperative with the tool standard 88 and with the sleeve 69 to determine the angular relation between the tool standard 88 and sleeve 69, and in this respect the adapter 73 performs the same function as the adapter 22 of the construction shown in Figs. 2 and 3. The beam 76 extends in a plane at right angles to the axis of the gang tube 68, and the adapter 74 is cooperative with the beam 76 and with the gang tube 68 to determine said angular relation between the beam 76 and the gang tube 68.

The modified construction shown in Figs. 6 and 7, like the construction shown in Figs. 2 and 3, includes a mounting structure comprising a longitudinal section including a gang tube and a transverse end section including a beam element, and releasable fastening means common to said transverse section and to a tool supporting standard and operable to clampingly secure said transverse section to one end and said supporting standard to the other end of said longitudinal section.

It should be understood that the invention claimed herein is not limited to the exact details of design and construction disclosed, and it is contemplated as including modifications within the scope of the appended claims.

It is claimed and desired to secure by Letters Patent:

1. In a tool gang assembly for agricultural implements, a supporting structure for mounting earth engaging tools thereon comprising a longitudinal section, an elongated end section extending at an angle relative to said longitudinal section, an adapter associated with one of said sections and cooperative with the other to determine said angle between said sections, a supporting standard for one of said tools, releasable fastening means common to said adapter and to said supporting standard and operable to clampingly secure said adapter in its cooperative relation with said other section to the latter, and to clampingly secure said supporting standard to said longitudinal section at the end of the latter remote from said end section, and means for mounting another of said earth engaging tools on said end section.

2. In a tool gang assembly for agricultural implements, a supporting structure for mounting earth engaging tools thereon comprising a longitudinal section, an elongated end section extending at an angle relative to said longitudinal section, an adapter associated with said end section in angularly fixed relation thereto, and cooperative with said longitudinal section to determine said angle between said sections, a supporting standard for one of said tools, releasable fastening means common to said adapter and to said supporting standard and operable to clampingly secure said adapter in its cooperative relation with said longitudinal section to the latter, and to clampingly secure said supporting standard to said longitudinal section at the end of the latter remote from said end section, and means for mounting another of said earth engaging tools on said end section.

3. In a tool gang assembly for agricultural implements, a supporting structure for mounting earth engaging tools thereon comprising a longitudinal section, an elongated end section extending at an angle relative to said longitudinal section, an adapter clampingly engageable with said end section in different positions of axial adjustment of the latter relative to said adapter and cooperative with said sections to determine said angle therebetween, a supporting standard for one of said tools, releasable fastening means common to said adapter and to said supporting standard and operable to clampingly secure said end section, in any of said axially adjusted positions thereof, to said adapter and to clampingly secure said adapter in its cooperative relation with said longitudinal section to the latter and to clampingly secure said supporting standard to said longitudinal section at the end of the latter remote from said end section; and means for mounting another of said earth engaging tools on said end section.

4. In a tool gang assembly for agricultural implements, a supporting structure for mounting earth engaging tools thereon comprising a longitudinal section, an elongated end section extending at an angle relative to said longitudinal section, an adapter rotatable circumferentially of one of said sections and cooperative therewith and with the other of said sections to determine said angle between said sections, a supporting standard for one of said tools, releasable fastening means common to said adapter and to said supporting standard and operable to clampingly secure said adapter in rotatively adjusted position and in its cooperative relation with said other section to the latter, and to clampingly secure said one tool standard to said longitudinal section at the end of the latter remote from said end section, and means for mounting another of said earth engaging tools on said end section.

5. In a tool gang assembly for agricultural implements, a supporting structure for mounting earth engaging tools thereon comprising a longitudinal section, an elongated end section extending at an angle relative to said longitudinal section, an adapter rotatable circumferentially of said longitudinal section and cooperative therewith and with said end section to determine said angle between said sections in rotatively adjusted positions of said adapter and of said end section relative to said longitudinal section, a supporting standard for one of said tools, releasable fastening means common to said adapter and to said supporting standard and operable to clampingly secure said adapter in any of said rotatively adjusted positions thereof and in its cooperative relation with said longitudinal section to the latter, and to clampingly secure said supporting standard to said longitudinal section at the end of the latter remote from said end section, and means for mounting another of said earth engaging tools on said end section.

6. In a tool gang assembly for agricultural implements, a supporting structure for mounting earth engaging tools thereon comprising a longitudinal section having an axially tapered portion at one end thereof, an elongated end section extending at an angle relative to said longitudinal section, an adapter having a tapered portion matching said tapered portion of said longitudinal section and cooperative therewith and with said end section to determine said angle between said sections, a supporting standard for one of said tools, releasable fastening means common to said adapter and to said supporting standard and operable to wedge said tapered portions upon each other and to clampingly secure said supporting standard to said longitudinal section at the end of the latter remote from said one end thereof; and means for mounting another of said earth engaging tools on said end section.

7. In a tool gang assembly for agricultural implements, a supporting structure for mounting earth engaging tools thereon comprising a longitudinal section having an axially tapered portion at one end thereof, an elongated end section extending at an angle relative to said longitudinal section and having a transversely tapered portion matching said axially tapered portion of said longitudinal section, a supporting standard for one of said tools, releasable fastening means common to said end section and to said supporting standard and operable to wedge said tapered portions upon each other and to clampingly secure said one tool standard to said longitudinal section at the end of the latter remote from said one end thereof; and means for mounting another of said earth engaging tools on said end section.

8. In a tool gang assembly for agricultural implements, a supporting structure for mounting earth engaging tools thereon comprising a longitudinal section having an axially extending conical portion at one end thereof, an elongated end section extending at an angle relative to said longitudinal section and having a transversely extending integral conical portion matching said conical portion of said longitudinal section, a supporting standard for one of said tools, releasable fastening means common to said end section and to said supporting standard and operable to wedge said conical portions upon each other and to thereby secure said end section clampingly in fixed relation to said longitudinal section, and to clampingly secure said supporting standard to said longitudinal section at the end of the latter remote from said conical portion thereof; and means for mounting another of said earth engaging tools on said longitudinal section in different positions of adjustment axially of said end section.

9. In a tool gang assembly for agricultural implements, a supporting structure for mounting earth engaging tools thereon comprising a longitudinal section having an axially extending conical portion at one end thereof, a beam element extending at an angle relative to said longitudinal section, an adapter clampingly engageable with said beam element in different positions of axial adjustment of the latter relative to said adapter and having a conical portion matching said conical portion of said longitudinal section, a supporting standard for one of said tools, releasable fastening reacting between said adapter and said supporting standard and operative to tighten said adapter upon said beam element and to wedge said conical portions upon each other and to thereby secure said beam element in angularly and axially fixed relation to said longitudinal section, and to clampingly secure said supporting standard to said longitudinal section at the end of the latter remote from said conical portion thereof; and means for mounting another of said earth engaging tools on said beam element.

10. In a tool gang assembly for agricultural implements, a mounting structure having a longitudinal axis, a supporting standard for an earth engaging tool at one end of said mounting structure extending in a plane at an angle relative to said axis, a beam element extending in another plane at an angle relative to said axis at the opposite end of said mounting structure, means for mounting another earth engaging tool on said beam element, and means for releasably connecting said supporting standard and said beam element with said supporting structure, said last named means comprising an adapter cooperative with said supporting standard and abuttable with said one end of said supporting structure in the direction of said axis to determine said angular relation between said supporting standard and said axis, another adapter cooperative with said beam element and abuttable with said other end of said supporting structure in the direction of said axis to determine said angular relation between said beam element and said axis, and clamping means reacting between said supporting standard and said beam element to urge said adapters into abutting engagement with the respective ends of said mounting structure.

11. In a tool gang assembly for agricultural implements, a mounting structure comprising a tubular member and end portions tapered axially of said tubular member, a tapered adapter wedgingly seated on one of said end portions, a beam element associated with said adapter in angularly fixed relation thereto, means for mounting an earth engaging tool on said beam element, another tapered adapter wedgingly seated on the other of said end portions and having a transverse groove at its free end, an eye bolt, a supporting standard for another earth engaging tool extending through the loop of said eye bolt and seated in said groove; the shank of said eye bolt extending axially through said tubular member and through said first mentioned adapter; and a nut threaded upon a portion of said shank projecting beyond said first mentioned adapter.

12. In a tool gang assembly for agricultural implements, a mounting structure comprising a sleeve member and a tubular member separably aligned in axially abuttable relation with each other, an adapter abuttable axially with the free end of said tubular member, a beam element associated with said adapter in angularly fixed relation thereto, means for mounting an earth engaging tool on said beam element, another adapter abuttable axially with the free end of said sleeve member, an eye bolt, a supporting standard for another earth engaging tool extending through the loop of said eye bolt and seated on said other adapter; the shank of said eye bolt extending axially through said sleeve and tubular members and through said first mentioned adapter; and a nut threaded upon a portion of said shank projecting beyond said first mentioned adapter.

13. In a tool gang assembly for agricultural implements, a mounting structure comprising a sleeve member having axially tapered end portions and a tubular member having an axially tapered portion at one of its ends wedgingly seated on one of said axially tapered end portions of said sleeve member, said tubular member having another axially tapered portion at the end thereof remote from said sleeve member; an adapter tapered axially of said tubular member and wedgingly seated on said last named tapered portion of the latter, a beam element associated with said adapter in angularly fixed relation thereto, means for mounting an earth engaging tool on said beam element, another tapered adapter wedgingly seated on the other of said tapered end portions of said sleeve member and having a transverse groove at its free end, an eye bolt, a supporting standard for another earth engaging tool extending through the loop of said eye bolt and seated in said groove; the shank of said eye bolt extending axially through said sleeve and tubular members and through said first named adapter; and a nut threaded upon a portion of said shank projecting beyond said first named adapter.

14. In a tool support for agricultural implements, a mounting structure having a tapered portion, a tool carrying bar element extending in the direction of its length in a plane at an angle to the axis of said tapered portion, an adapter having a contractible head portion embracing said bar element and a tapered portion wedgingly engageable with said first mentioned tapered portion, and releasable fastening means reacting between said mounting structure and said adapter and operable to contract said head portion upon said bar element and to wedge said tapered portions upon each other to thereby secure said bar element in said plane and against displacement relative to said mounting structure.

15. A tool support presenting a pair of aligned oppositely facing seating portions, a pair of mounting structures presenting seating portions complementary to said oppositely facing seating portions, said oppositely facing and complementary seating portions affording angular adjustment of said mounting structures relative to said support and relative to each other, a releasable fastener common to said support and mounting structures, said fastener being operable to clamp said mounting structures against said support with said oppositely facing and complementary seating portions wedgingly engaged in fixed selected angular relation with respect to each other, a tool supporting bar carried by each of said mounting structures for angular adjustment therewith and for adjustment relative thereto generally along the longitudinal axis of said bar.

16. A hollow tool support presenting a pair of aligned oppositely facing conical seating portions, a pair of mounting structures presenting seating portions complementary to said oppositely facing conical seating portions, said oppositely facing and complementary seating portions affording angular adjustment of said mounting structures relative to said support and relative to each other, a releasable fastener common to said support and mounting structures, said fastener being operable to clamp said mounting structures against said support with said oppositely facing and complementary seating portions wedgingly engaged in fixed selected angular relation with respect to each other, a tool supporting bar carried by each of said mounting structures for angular adjustment therewith and for adjustment relative thereto generally along the longitudinal axis of said bar.

17. A tool support presenting a pair of aligned oppositely facing seating portions, a pair of mounting structures presenting seating portions complementary to said oppositely facing seating portions, said oppositely facing and complementary seating portions having a common axis and affording angular adjustment of said mounting structures relative to said support and relative to each other, one of said mounting structures including a tool bar supporting beam disposed at a right angle to said axis, a releasable fastener common to said support and mounting structures, said fastener being operable to clamp said mounting structures against said support with said oppositely facing and complementary seating portions wedgingly engaged in fixed selected angular relation with respect to each other, a tool supporting bar carried by each of said mounting structures for angular adjustment therewith, said bars being also adjustable relative to said supporting structures generally along their own longitudinal axes with one of said bars being attached to said beam for adjustment longitudinally thereof.

18. In a tool support for agricultural implements, a mounting structure having a conical portion, a tool beam extending transversely to the axis of said conical portion and including a conical seat portion wedgingly engageable with said first mentioned conical portion, a tool carrying bar disposed transversely with respect to said beam and being detachably secured thereto for adjustment both longitudinally and transversely relative to the longitudinal axis of the beam, and releasable fastening means reacting between said mounting structure and said beam and operable to wedge said conical portions upon each other and thereby secure said beam in any selected angular relation with respect to said mounting structure.

19. In a tool gang assembly for agricultural implements, a supporting structure for mounting earth working tools thereon comprising an elongated first section, an elongated tool mounting second section positionable in transverse abuttable relation to one end of said first section, a tool supporting standard positionable adjacent the other end of said first section, fastening means carried by said first section and including projecting opposite end portions mounting said second section and standard for angular movement relative to said first section in directions generally at a right angle to the longitudinal axis of the latter and relative to each other, said fastening means also including an element actuable to release said second section and standard for said relative movement thereof and actuable to securely clamp said second section and standard in selected positions of angular adjustment relative to the opposite ends of said first section.

20. In a tool gang assembly for agricultural implements, a supporting structure for mounting earth working tools thereon comprising an elongated hollow first section, an elongated tool mounting second section positionable in transverse abuttable relation to one end of said first section, a tool supporting standard positionable adjacent the other end of said first section, fastening means carried by said first section and including a first element extending longitudinally through said first section and presenting oppositely projecting end portions mounting said second section and standard for angular movement relative to said first section in directions generally at a right angle to the longitudinal axis of the latter and relative to each other, said fastening means also including a second element coacting with one end of said first element and being actuable to release said second section and standard for said relative movement thereof and actuable to securely clamp said second section and standard in selected positions of angular adjustment relative to the opposite ends of said first section.

WALTER G. CHARLEY.

REFERENCES CITED

The following references are of record in the file of this patent:

UNITED STATES PATENTS

| Number | Name | Date |
|---|---|---|
| 139,471 | Manny | June 3, 1873 |
| 445,267 | Tasker | Jan. 27, 1891 |
| 2,129,298 | Ariens | Sept. 6, 1938 |